United States Patent
Scholl

(10) Patent No.: US 7,369,938 B2
(45) Date of Patent: May 6, 2008

(54) NAVIGATION SYSTEM HAVING MEANS FOR DETERMINING A ROUTE WITH OPTIMIZED CONSUMPTION

(75) Inventor: Gregor Scholl, Dortmund (DE)

(73) Assignee: Siemens Aktiengesellschaft, München (DE)

( * ) Notice: Subject to any disclaimer, the term of this patent is extended or adjusted under 35 U.S.C. 154(b) by 622 days.

(21) Appl. No.: 10/913,264

(22) Filed: Aug. 6, 2004

(65) Prior Publication Data
US 2005/0055157 A1 Mar. 10, 2005

(30) Foreign Application Priority Data
Aug. 6, 2003 (DE) .............................. 103 35 927

(51) Int. Cl.
*G01C 21/26* (2006.01)

(52) U.S. Cl. ...................................... 701/207; 701/202

(58) Field of Classification Search ........ 701/200–202, 701/207–208, 211, 213–215, 23, 25, 28, 96, 701/117–119; 342/357.06; 340/988, 995.1
See application file for complete search history.

(56) References Cited

U.S. PATENT DOCUMENTS

| 5,315,295 | A |  | 5/1994 | Fujii |  |
|---|---|---|---|---|---|
| 5,568,390 | A |  | 10/1996 | Hirota et al. |  |
| 5,627,752 | A |  | 5/1997 | Buck et al. |  |
| 5,790,976 | A |  | 8/1998 | Boll et al. |  |
| 5,913,917 | A |  | 6/1999 | Murphy |  |
| 6,005,494 | A |  | 12/1999 | Schramm |  |
| 6,026,346 | A | * | 2/2000 | Ohashi et al. | ............... 701/210 |
| 6,035,053 | A | * | 3/2000 | Yoshioka et al. | ............ 382/104 |
| 6,594,576 | B2 | * | 7/2003 | Fan et al. | .................... 701/117 |

FOREIGN PATENT DOCUMENTS

| DE | 196 05 458 C1 | 9/1997 |
| DE | 298 02 073 U1 | 9/1998 |
| DE | 101 29 149 A1 | 1/2002 |
| DE | 101 41 805 A1 | 5/2002 |
| DE | 101 62 866 A1 | 7/2003 |
| GB | 2 338 780 A | 12/1999 |

* cited by examiner

*Primary Examiner*—Yonel Beaulieu
(74) *Attorney, Agent, or Firm*—Cohen Pontani Lieberman & Pavane LLP

(57) ABSTRACT

A navigation system of a motor vehicle has an input unit, a position-determining unit, a central processor unit (CPU) for calculating a route between a first and a second location by reference to map data which contains information for determining a predicted fuel consumption for the route, and an output unit for outputting travel instructions which are matched with the current position of the vehicle. A maximum travel time for a journey from the first location to the second location is predefined by a user using the input unit and the route is determined such that the predefined maximum travel time is not exceeded, and the anticipated fuel consumption is minimized.

13 Claims, 2 Drawing Sheets

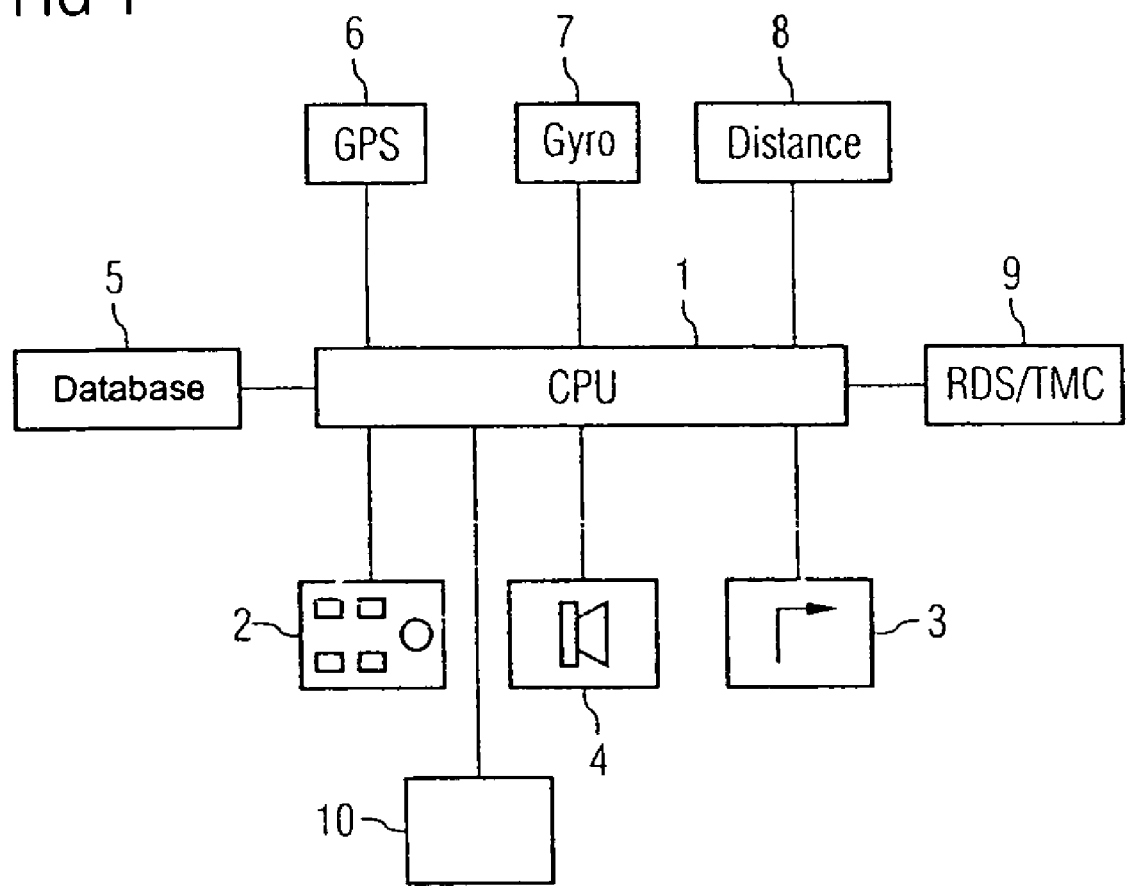

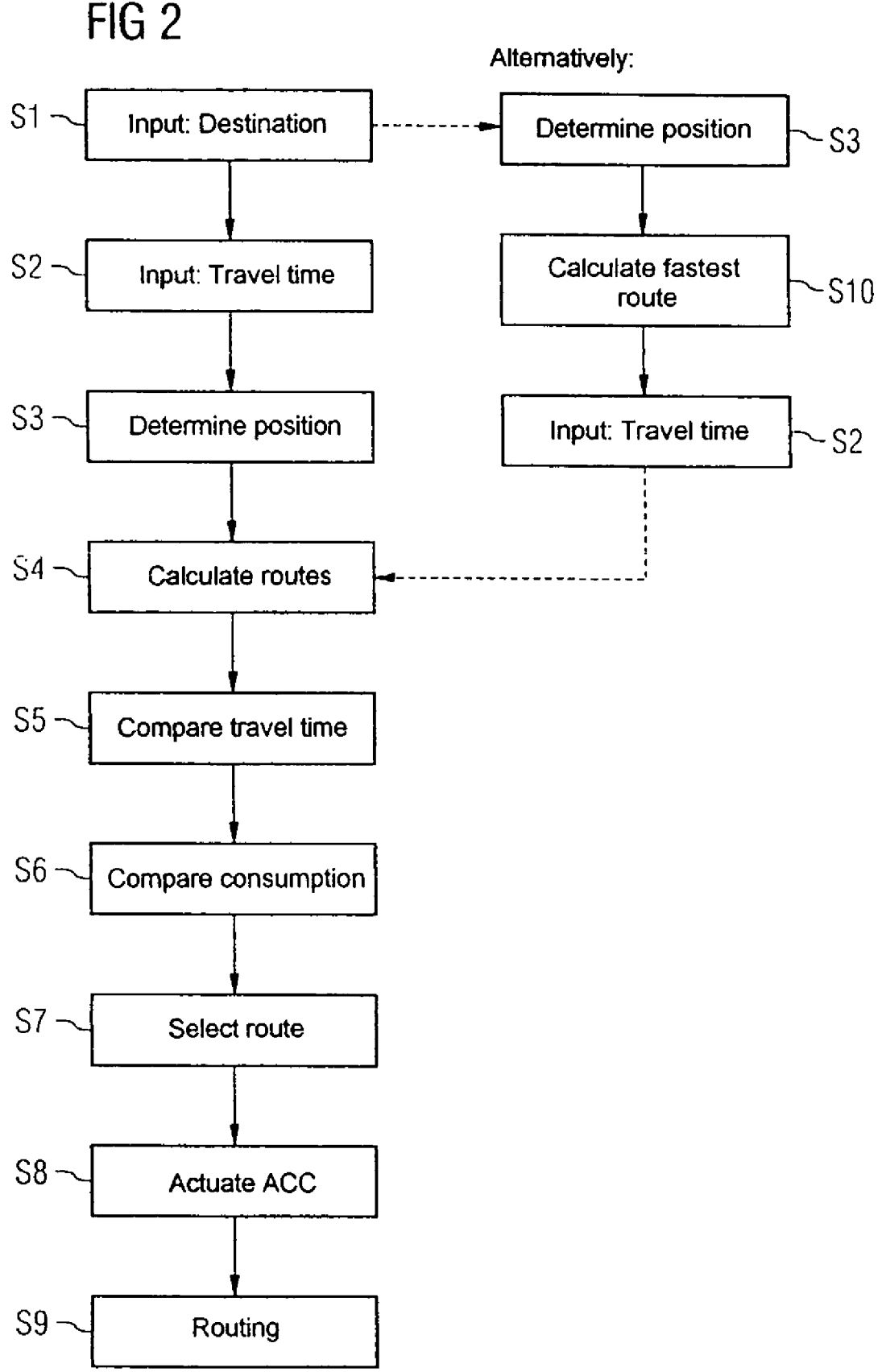

NAVIGATION SYSTEM HAVING MEANS FOR DETERMINING A ROUTE WITH OPTIMIZED CONSUMPTION

BACKGROUND OF THE INVENTION

1. Field of the Invention

The present invention relates to a navigation system of a motor vehicle having an input unit, a position-determining unit, a central processor unit for calculating a route between a first and a second location by reference to map data, which contains information for determining a predicted fuel consumption for the route, and an output unit for outputting travel instructions which are matched to the current position of the vehicle. The present invention also relates to a method for determining a route.

2. Description of the Related Art

A navigation system and a method for determining a route are known, for example, from DE 196 05 458 C1. In this known navigation system, a destination is first selected by the driver and the current position of the vehicle is determined by satellite navigation signals. The navigation system then calculates a plurality of routes from the current position of the vehicle to the destination. In the process, the fuel which is predicted to be required is calculated for each of the routes. The calculation of the fuel consumption is carried out on the basis of changes in altitude on the respective routes. The topological properties which are required for this are stored together with the road map data. A preferred route is selected from the various routes, the preferred route having the lowest fuel consumption. The preferred route is finally output. A disadvantage of this known method is that the fuel consumption is the only criterion for the selection of a route.

Furthermore, U.S. Pat. No. 5,315,295 and DE 101 29 149 A1 disclose feeding setpoint values to a travel speed controller from a navigation system.

SUMMARY OF THE INVENTION

An object of the present invention is to provide a navigation system for calculating a route with optimized consumption, of the type described at the beginning, such that it is better adapted to the requirements of a user. A further object of the present invention is to provide a method for determining a route such that the selection of a route is further optimized with respect to the requirements of the user.

The objects are achieved by a navigation system for a motor vehicle, comprising an input unit operatively arranged for receiving a user input defining a maximum travel time for a journey from a first location to a second location, a position-determining unit for determining a current position of the vehicle, an output unit for outputting travel instructions which are matched to a current position of the vehicle, and a central processing unit connected to said input unit, said position-determining unit and said output unit and operatively arranged for calculating at least a first route between the first location and the second location by reference to map data containing information for determining a predicted fuel consumption for the route, such that the maximum travel time is not exceeded and the anticipated fuel consumption is minimized.

The inventor has recognized that only taking into account the fuel consumption in the selection of a route can lead to unsatisfactory results for the user. As a result, in particular a routing which is optimized for consumption can have an unacceptable travel time. According to the invention there is therefore provision for a maximum travel time to be predefined by the input unit, for a journey from the first location to the second location, that is to say generally from the present position to the destination. The route is then determined such that the predefined maximum travel time is not exceeded and the predicted fuel consumption is minimized. From the plurality of possible routes, at first those routes for which the calculated travel time is not longer than the predefined maximum value are thus firstly selected. From this subset, that route which has the lowest fuel consumption is then selected. By combining the criteria of travel time and fuel consumption, a route is generated which corresponds to the requirements of the driver who is conscious of consumption, but at the same time the route accounts for the driver's peripheral timing conditions.

In particular there is provision that speed setpoint values are determined for individual parts of a route taking into account the predefined maximum travel time and topological properties of the parts of a route. In particular stretches with a positive gradient and stretches with a negative gradient are also taken into account. In the case of stretches with a negative gradient, the speed is generally higher and fuel consumption lower than for corresponding stretches with a positive gradient. A stretch of road with a severe negative gradient may result in a low fuel consumption but may only permit a restricted speed owing to the route having a plurality of bends. When planning the routes, a travel situation is thus calculated with respect to speed and consumption by reference to known data for each part of a route. The sum of these individual values results in the desired travel time with the peripheral condition of minimum consumption.

The navigation system may be configured to actuate a speed control system of the motor vehicle using the calculated speed setpoint values of the parts of a route as a function of the current position. In this configuration, as a result not only is an optimized route selected but in addition a speed control system of the motor vehicle is actuated using the speed values on which the calculation is based. During the journey, the situation on which the route calculation is based is mapped as precisely as possible by continuously matching the setpoint values and actual values.

In one development, the speed control system is additionally connected to an inter-vehicle distance control system. The navigation system predefines setpoint values for the speed control system but these can be over-ridden by information from the inter-vehicle distance control system, and thus for example the speed of a vehicle traveling ahead. In this way automated driving is achieved to a certain extent.

The fuel consumption may be calculated by the central processor unit in a wide variety of ways. In a first embodiment there is provision for the fuel consumption to be calculated by reference to topological properties of the calculated route. Here, stretches of positive gradient and negative gradient are taken into account and, for example, an average fuel consumption of the vehicle is correspondingly weighted.

In another embodiment, the map data additionally contains data relating to a relative fuel consumption of parts of a route. Here, information about a relative fuel consumption is therefore included directly in the map data. This relative value may be recalculated in each case into a value which is representative of the respective vehicle.

The calculation of fuel consumption by reference to the topological properties or by reference to a relative fuel consumption of parts of a route which is contained in the map data into an absolute fuel consumption of the corresponding vehicle may be carried out, in particular, by virtue of the fact that characteristic curves or an algorithm for determining the fuel consumption of the motor vehicle under different travel conditions are stored.

In one embodiment of the present invention the navigation system can, in addition, calculate a fastest or a shortest route including the anticipated fuel consumption and display it for selection. In addition to the route which has optimized consumption and whose travel time lies within the predefined value, the fastest route between the first location and the second location, or the shortest route between the first location and the second location, are then additionally determined, for which purpose the respective anticipated fuel consumption is also calculated. This fastest or shortest route is additionally displayed for the purpose of selection so that the driver can, for example, compare the magnitude of the difference in time and of the difference in consumption between the fastest route and the route with optimized consumption. The driver may then freely select which route he prefers. As a result, the satisfaction of the driver with the selected route can be further increased.

In a method according to the present invention for determining a route between a starting point and a destination by reference to road map data which includes road classes, topological properties and speed restrictions, the following method steps are provided:

calculating routes between the starting point and the destination whose anticipated travel time is shorter than a predefined value, determining a fuel consumption for the calculated routes, and selecting the route with the lowest fuel consumption.

In particular, in this context the fuel consumption is calculated taking into account the topological properties, the road class and speed restriction of individual parts of a route as well as vehicle-specific prescriptions.

In one particular embodiment, the fastest route between the first and the second location is first calculated and the travel time for the fastest route is displayed so that the driver is provided with a point of reference for predefining the travel time. The predefined value is then input and the routes with optimized consumption are calculated.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 1 is a schematic block diagram of a navigation system which is connected to a speed control system according to the present invention; and FIG. 2 is a flow diagram showing a method sequence of a method according to the present invention.

DETAILED DESCRIPTION OF THE PRESENTLY PREFERRED EMBODIMENTS

FIG. 1 illustrates the components of a navigation system for motor vehicles according to an embodiment of the present invention. A central component of the navigation system is the central processor unit (CPU) 1, which also contains the necessary memory elements. An operator control unit 2 is connected to the CPU 1. The operator control unit allows an operator to input or select, for example, the destination. For this purpose, the operator control unit 2 contains, for example, one or more operator control elements for controlling a cursor. The operator control unit 2 may be accommodated in the same housing as the CPU 1. Alternatively, the operator control unit 2 may also be embodied as a remote control which is connected to the CPU 1, for example via an optical interface or a radio interface.

An optical output unit 3 is connected to the CPU 1 and can be used to output a map display and routing information as well as other information. The routing information may also be output audibly via a loudspeaker 4.

The CPU 1 is in addition connected to a data base 5 which contains the map data. This data is stored, for example, on a CD-ROM or a DVD. In this case, the navigation system contains a CD-ROM or DVD drive which is connected to the CPU 1. The CPU 1 uses the map data to calculate the optimum route according to the present invention when the starting point and the destination are known and the calculated optimum route can then be output via the visual output unit 3.

To calculate the current position of the vehicle, the navigation system also contains a receiver 6, i.e., GPS receiver, for receiving navigation signals. To be able to carry out a determination of position which is independent of satellites, the navigation system also contains a direction sensor 7, i.e., a gyro or compass, and a displacement sensor or distance sensor 8, which are also connected to the CPU 1 so that a suitable computer program can be used to determine positions using these signals.

The CPU 1 in the illustrated example is additionally connected to a radio receiver 9 which is designed to receive RDS-TMS signals. As a result, received traffic information from the radio receiver 9 can be passed to the CPU 1 and be taken into account in the calculation of a route. Alternatively, traffic information may also be received by a mobile telephone, in particular using the GSM standard, and passed on to the central processor unit.

In contrast to the described navigation system, the map data may also be transmitted into the vehicle from a central service point via a mobile telephone or other communication device. In this case, a reading device for a storage medium containing the map data in the vehicle may be dispensed with. Corresponding navigation systems are known in principle.

Furthermore, the CPU 1 is connected to a speed control system 10 by a corresponding interface and a motor vehicle BUS system 10a. The CPU 1 supplies setpoint values to the speed control system 10 which have been used for determining a travel time during the calculation of a route. The speed control system 10 receives actual values of the speed by a tachometer signal. The control signal of the speed control system 10 is fed to a turbocharger or a mixture conditioner, an injection system or a transmission. Speed control systems are known per se so that there is no need to provide further details here.

Among other things, the CPU 1 calculates the route according to the present invention. A corresponding algorithm for performing the method according to the present invention is shown in FIG. 2. In step S1, a driver or operator of the inventive navigation system first inputs the desired destination into the navigation system or selects the destination from a list using the input unit 2 in the navigation system. In step S2, the driver or operator additionally inputs the maximum travel time that is acceptable for him. In step S3, the position of the vehicle is determined. This is generally carried out by evaluating the satellite navigation signals which are supplied by the receiver 6. In step S4, different routes between the current position and the destination are calculated. In step S5, the calculated routes are compared, with respect to their travel time, with the predefined maximum travel time value which has been input in step S2. Only routes whose travel time is not longer than the predefined maximum travel time value are retained. Alternatively, a comparison of the travel time with the predefined maximum travel time value may already have been carried out in step S4 during the calculation of each individual route, and for a route to have been immediately rejected if the travel time is longer than the predefined maximum travel time value.

In step S4, in addition to the travel time, a predicted fuel consumption for the individual routes is also determined during the calculation of a route. In step S6, the routes are then compared with respect to the fuel consumption, and that route which has the lowest fuel consumption is selected, step S7. During the selection of a route in step S7, it is alternatively possible to select, in addition to the route with the lowest fuel consumption, also the fastest route and to display both routes with the comparison data on the display unit 3. The driver or operator may then select whether the operator wishes to use the fastest route or the route with optimized consumption.

During the journey on the selected route, the speed control system 10 is actuated by the navigation system in step S8. The speed, which is used as the basis for the calculation of a route, for the part of a route which is currently being traveled along is output as a setpoint value to the speed control system 10. In addition, in step S9, routing information is output, as is known from conventional navigation systems.

In an alternative embodiment of the inventive method, after the destination has been input (step S1) and the position has been determined (step S3), the fastest route may also firstly be calculated and output (step S10). By reference to the travel time for the fastest route, the driver or operator then predefines a tolerable maximum travel time (step S2) for a route with optimized consumption. Then, the route with optimized consumption is calculated in step S4 in the way described in more detail above, the fastest route and the route with optimized consumption being then displayed to the driver for selection. This alternative embodiment allows the operator to input realistic predefined values for the travel time in step S2.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A navigation system for a motor vehicle, comprising:
   an input unit operatively configured to receive a user input defining a maximum travel time for a journey from a first location to a second location;
   a position-determining unit configured to determine a current position of the motor vehicle;
   an output unit for outputting travel instructions which are matched to a current position of the motor vehicle; and
   a central processing unit operatively coupled to said input unit, said position-determining unit and said output unit and operatively configured to calculate at least a first route between the first location and the second location by reference to map data containing information for determining a predicted fuel consumption for the route, such that the maximum travel time is not exceeded and the anticipated fuel consumption is minimized.

2. The navigation system of claim 1, wherein said central processing unit is operatively arranged for determining speed setpoint values for individual parts of the at least first route in response to the maximum travel time and topological properties of parts of the route.

3. The navigation system of claim 2, wherein said central processing unit is operatively arranged for actuating a speed control system of the motor vehicle using the calculated speed setpoint values of parts of the at least first route as a function of the current position.

4. The navigation system of claim 3, wherein said speed control system is connected to an inter-vehicle distance control system.

5. The navigation system of claim 1, wherein said central processor unit is operatively arranged for calculating the fuel consumption by reference to topological properties of the at least first route in the map data.

6. The navigation system of claim 1, further comprising a memory storing the map data and wherein the map data contains data relating to a relative fuel consumption of parts of the at least first route.

7. The navigation system of claim 1, further comprising a memory storing one of a characteristic curve and an algorithm for determining the fuel consumption of the motor vehicle under different travel conditions.

8. The navigation system of claim 1, wherein said central processing unit is operatively arranged for additionally calculating one of a fastest and a shortest route including the anticipated fuel consumption and causing the at least first route and the one of a fastest and a shortest route to be displayed by said output unit for selection by the user.

9. A method for determining a route between a starting point and a destination by reference to road map data which includes road classes, topological properties and speed restrictions, comprising the steps of:
   calculating routes between the starting point and the destination whose anticipated travel time is shorter than a predefined input defining a maximum travel time value between the starting point and the destination;
   determining a fuel consumption for the calculated routes; and
   selecting the route with the lowest fuel consumption.

10. The method of claim 9, wherein said step of determining the fuel consumption includes calculating the fuel consumption based on the topological properties, the road class and speed restrictions of individual parts of the route and vehicle-specific data.

11. The method of claim 9, further comprising the step of calculating and displaying at least one of a fastest route and a shortest route including the anticipated fuel consumption for the at least one of a fastest route and a shortest route.

12. The method of claim 11, wherein the step of calculating the fastest route between the first location and the second location is first calculated, the travel time for the fastest route is then displayed, a predefined maximum travel time value with optimized consumption is then input; and a route which has optimized consumption and whose travel time is shorter than the predefined value is then calculated.

13. The method of claim 10, wherein the vehicle-specific data comprises one of consumption characteristic curves and an algorithm for determining the fuel consumption of the motor vehicle under different travel conditions.

* * * * *